(12) United States Patent
Holmbeck et al.

(10) Patent No.: US 10,883,552 B2
(45) Date of Patent: Jan. 5, 2021

(54) ROTATIONAL COUPLING DEVICE WITH FLUX CONDUCTING BEARING SHIELD

(71) Applicant: Warner Electric Technology LLC, Braintree, MA (US)

(72) Inventors: Brian K. Holmbeck, Sharon, WI (US); Michael Humy, Roscoe, IL (US)

(73) Assignee: Warner Electric Technology LLC, Braintree, MA (US)

( * ) Notice: Subject to any disclaimer, the term of this patent is extended or adjusted under 35 U.S.C. 154(b) by 50 days.

(21) Appl. No.: 16/379,883

(22) Filed: Apr. 10, 2019

(65) Prior Publication Data

US 2020/0325944 A1 Oct. 15, 2020

(51) Int. Cl.
*F16D 27/12* (2006.01)
*F16D 27/14* (2006.01)
(Continued)

(52) U.S. Cl.
CPC ............ *F16D 27/112* (2013.01); *F16D 27/12* (2013.01); *F16D 27/14* (2013.01); *F16D 2027/008* (2013.01)

(58) Field of Classification Search
CPC ........ F16D 27/112; F16D 27/14; F16D 27/12; F16D 2027/008; F16D 27/108; F16D 2027/007; F16D 27/01; F16D 2300/08; F16D 2121/20; F16D 2121/22; F16D 67/06

See application file for complete search history.

(56) References Cited

U.S. PATENT DOCUMENTS 3,624,768 A 11/1971 Nussli
3,679,034 A * 7/1972 Miller .................... F16D 27/11
192/111.1
(Continued)

FOREIGN PATENT DOCUMENTS

CN 203627590 U 6/2014
CN 208651480 U 3/2019
(Continued)

OTHER PUBLICATIONS

English (Machine) Translation of CN 203627590 U.
(Continued)

*Primary Examiner* — Mark A Manley
(74) *Attorney, Agent, or Firm* — Reising Ethington P.C.

(57) ABSTRACT

A rotational coupling includes a rotor configured for rotation about a rotational axis. The rotor includes a hub disposed about the axis and configured to receive a shaft and a disc extending radially outwardly from the hub. An armature and electromagnet are disposed on opposite axial sides of the disc. The electromagnet is fixed against rotation. A bearing is disposed between the hub and the electromagnet. The hub and electromagnet engage the inner and outer races, respectively of the bearing on opposite axial sides of the bearing. A spacer is disposed radially inwardly of the electromagnet and engages the inner race of the bearing on the same axial side of the bearing as the electromagnet. An air gap separates the spacer from the electromagnet. A shield is supported by the spacer and extends radially outwardly therefrom such that a portion of the shield is axially aligned with the air gap.

19 Claims, 3 Drawing Sheets

(51) Int. Cl.
*F16D 27/112* (2006.01)
*F16D 27/00* (2006.01)

(56) References Cited

U.S. PATENT DOCUMENTS

| | | | | |
|---|---|---|---|---|
| 4,126,215 | A | 11/1978 | Puro | |
| 4,129,026 | A * | 12/1978 | Pierce | B21D 53/261 |
| | | | | 72/370.13 |
| 4,210,890 | A * | 7/1980 | Olsen | B60H 1/3222 |
| | | | | 335/281 |
| 5,396,976 | A * | 3/1995 | Koitabashi | F16D 27/112 |
| | | | | 192/112 |
| 7,063,193 | B2 | 6/2006 | Yoshida | |
| 7,975,818 | B2 * | 7/2011 | Pardee | F16D 27/004 |
| | | | | 192/18 B |
| 9,709,111 | B1 * | 7/2017 | Gill | F16D 65/16 |
| 10,113,596 | B2 | 10/2018 | Nakajima et al. | |
| 2006/0186605 | A1 | 8/2006 | Yoshida | |
| 2006/0219497 | A1 | 10/2006 | Organek et al. | |
| 2008/0312018 | A1 | 12/2008 | Nakata et al. | |
| 2009/0229941 | A1 * | 9/2009 | Pardee | F16D 27/112 |
| | | | | 192/84.961 |
| 2013/0015033 | A1 | 1/2013 | Pardee et al. | |
| 2015/0129382 | A1 | 5/2015 | Isono | |
| 2018/0047489 | A1 * | 2/2018 | Kato | F16D 27/112 |
| 2018/0187727 | A1 | 7/2018 | Hornbrook et al. | |

FOREIGN PATENT DOCUMENTS

| | | |
|---|---|---|
| JP | S50-18893 U | 3/1975 |
| JP | S52-22847 U | 2/1977 |
| JP | S54-169645 U | 11/1979 |
| JP | S60-62630 U | 5/1985 |

OTHER PUBLICATIONS

SKF USA Inc., "NILOS-Rings Metal Seals for Bearings," (2008).
International Search Report issued in corresponding International (PCT) Patent Application No. PCT/US2020/027128 (dated Sep. 28, 2020).
Written Opinion issued in corresponding International (PCT) Patent Application No. PCT/US2020/027128 (dated Sep. 28, 2020).

* cited by examiner

ROTATIONAL COUPLING DEVICE WITH FLUX CONDUCTING BEARING SHIELD

BACKGROUND OF THE INVENTION a. Field of the Invention

This disclosure relates to a rotational coupling device. In particular, the disclosure relates to a rotational coupling device having a shield that inhibits fluids and particulates from reaching a bearing in the device while also facilitating assembly of the device and improving flux transfer within the device.

b. Background Art

Rotational coupling devices such as clutches and brakes are used to control transfer of torque between two bodies. In conventional electromagnetic coupling devices, a coupling disc or rotor is coupled to an input or output member and an armature disposed on one side of the disc is coupled to the other of the input and output members. An electromagnet is disposed on the opposite side of the disc relative to the armature and is energized and de-energized to cause the armature to engage with, and disengage from, the disc in order to rotatably couple or decouple the input and output members and/or brake one of the members. The electromagnet is often fixed against rotation. Therefore, conventional coupling devices include a bearing disposed between the electromagnet and rotating parts of the coupling device. Depending on the application in which the device is being used, the bearing may be exposed to contaminants such as fluids and/or dust thereby reducing the life of the device.

In order to inhibit contaminants from reaching the bearing, seals have been developed that can be attached to one of the races of the bearing and extend across the gap between the races. Use of these seals requires maintaining an inventory of the seals, however, and a separate operation to assemble the seal to the bearing. Further, assembly of the seal to the bearing race is difficult and can result in damage or a change in the functionality of the bearing.

The inventors herein have recognized a need for a rotational coupling device that will minimize and/or eliminate one or more of the above-identified deficiencies.

BRIEF SUMMARY OF THE INVENTION

This disclosure relates to a rotational coupling device. In particular, the disclosure relates to a rotational coupling device having a shield that inhibits fluids and particulates from reaching a bearing in the device while also facilitating assembly of the device and, in certain embodiments, improving flux transfer within the device.

A rotational coupling device in accordance with one embodiment of the present teachings includes a rotor configured for rotation about a rotational axis. The rotor includes a rotor hub disposed about the rotational axis and configured to receive a shaft and a rotor disc extending radially outwardly from the rotor hub. The device further includes an armature disposed on a first axial side of the rotor disc and an electromagnet disposed on a second axial side of the rotor disc opposite the armature and fixed against rotation. The device further includes a bearing disposed between the rotor hub and the electromagnet. The rotor hub engages an inner race of the bearing on a first axial side of the bearing and the electromagnet engages an outer race of the bearing on a second axial side of the bearing. The device further includes a spacer disposed radially inwardly of the electromagnet and engaging the inner race of the bearing on the second axial side of the bearing. An air gap separates the spacer from the electromagnet. The device further includes a shield supported by the spacer and extending radially outwardly therefrom such that a portion of the shield is axially aligned with the air gap.

A rotational coupling device in accordance with another embodiment of the present teachings includes a rotor configured for rotation about a rotational axis. The rotor includes a rotor hub disposed about the rotational axis and configured to receive a shaft and a rotor disc extending radially outwardly from the rotor hub. The device further includes an armature disposed on a first axial side of the rotor disc and an electromagnet disposed on a second axial side of the rotor disc opposite the armature and fixed against rotation. The device further includes a bearing disposed between the rotor hub and the electromagnet. The rotor hub engages an inner race of the bearing on a first axial side of the bearing and the electromagnet engages an outer race of the bearing on a second axial side of the bearing. The device further includes a spacer disposed radially inwardly of the electromagnet and engaging the inner race of the bearing on the second axial side of the bearing. An air gap separates the spacer from the electromagnet. The device further includes a shield supported by the spacer and extending radially outwardly therefrom such that a portion of the shield is axially aligned with the air gap. Magnetic flux travels from the rotor hub to the electromagnet through the shield when the electromagnet is energized.

A rotational coupling device in accordance with another embodiment of the present teachings includes a rotor configured for rotation about a rotational axis. The rotor includes a rotor hub disposed about the rotational axis and configured to receive a shaft and a rotor disc extending radially outwardly from the rotor hub. The device further includes an armature disposed on a first axial side of the rotor disc and an electromagnet disposed on a second axial side of the rotor disc opposite the armature and fixed against rotation. The device further includes a bearing disposed between the rotor hub and the electromagnet. The rotor hub engages an inner race of the bearing on a first axial side of the bearing and the electromagnet engages an outer race of the bearing on a second axial side of the bearing. The device further includes a spacer disposed radially inwardly of the electromagnet and engaging the inner race of the bearing on the second axial side of the bearing. An air gap separates the spacer from the electromagnet. The device further includes a shield supported by the spacer and extending radially outwardly therefrom such that a portion of the shield is axially aligned with the air gap. The shield assumes a first state when the electromagnet is not energized in which the shield is axially spaced from the electromagnet and the shield deforms and assumes a second state when the electromagnet is energized in which the shield contacts the electromagnet.

A rotational coupling device in accordance with the present teachings is advantageous relative to conventional coupling devices. The coupling device includes a shield that inhibits contaminants such as fluids and particulates from reaching a bearing of the device. Because the shield is supported by the spacer of the device, in certain embodiments the shield may be included with the device as a pre-assembled unit thereby eliminating the need to maintain a separate inventory of bearing shields and eliminating assembly of the shield to the bearing. Further, because the shield is not attached to the bearing race, potential damage and/or misalignment of the bearing during assembly is reduced. In certain embodiments, the shield is also configured to provide an additional flux transfer path for the electromagnetic circuit in the coupling device to improve flux transfer within the device. In certain embodiments, the shield may also deform in the presence of magnetic flux to reduce the size of an opening leading to the bearing and improve sealing of the bearing.

The foregoing and other aspects, features, details, utilities, and advantages of the invention will be apparent from reading the following detailed description and claims, and from reviewing the accompanying drawings illustrating features of this invention by way of example.

DETAILED DESCRIPTION OF THE INVENTION

Figure 1:
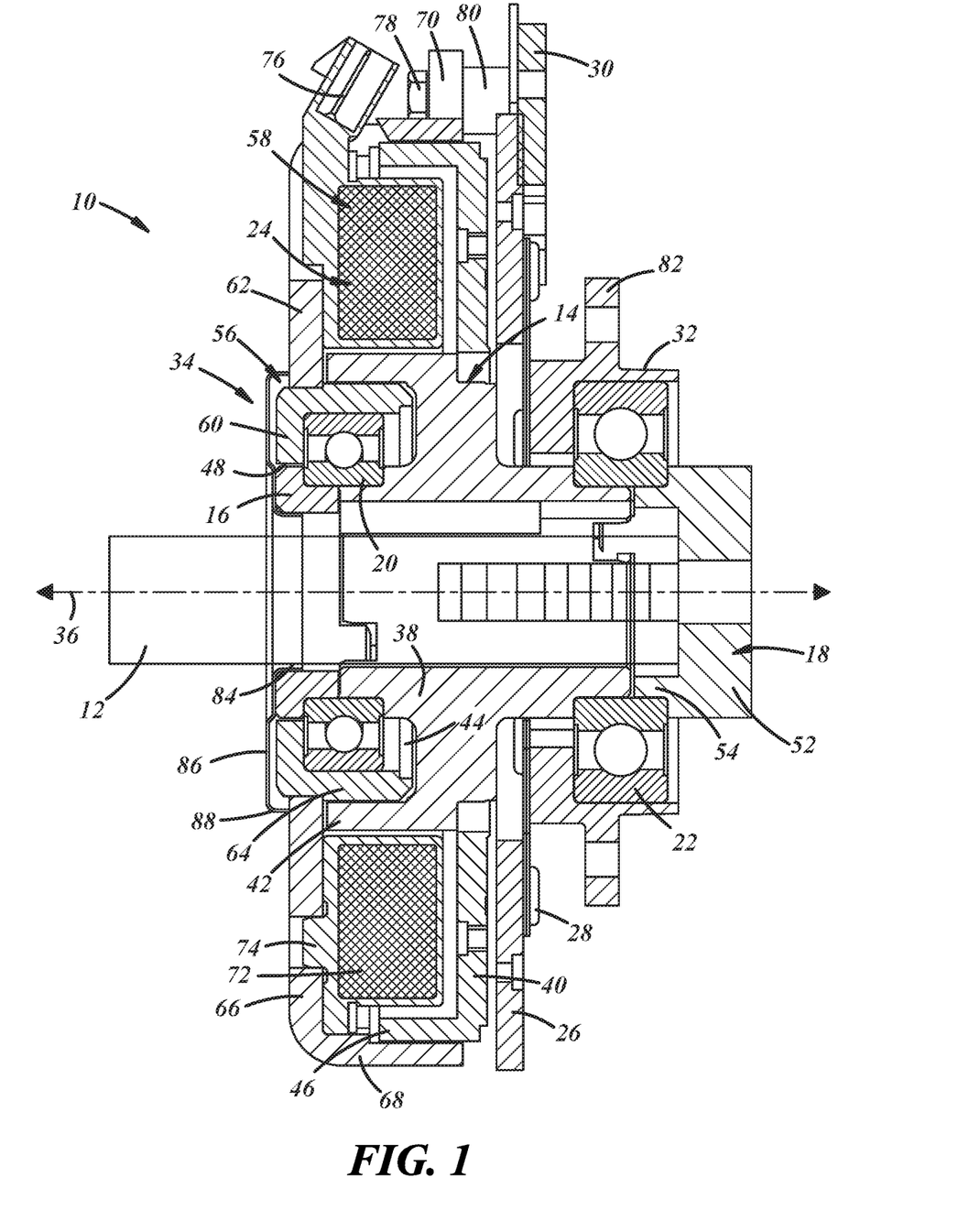
FIG. 1 is a cross-sectional drawing of a rotational coupling device in accordance with one embodiment of the present teachings.

Referring now to the drawings wherein like reference numerals are used to identify identical components in the various views, FIG. 1 illustrates a rotational coupling device 10 in accordance with one embodiment of the present invention. Device 10 functions as a clutch to selectively transfer torque between a shaft 12 and another device (not shown). Device 10 also functions as a brake when torque is not being transferred. Device 10 may be provided for use in a riding lawnmower or similar device. It will be understood by those of ordinary skill in the art, however, that device 10 may be used in a wide variety of applications requiring a clutch and/or brake. Device 10 may include a rotor 14, spacers 16, 18, bearings 20,22, an electromagnet 24, an armature 26, springs 28, a brake plate 30 and a torque transmission member 32. In accordance with the present teachings, coupling 10 further includes a bearing shield 34.

Shaft 12 may function as an input shaft—delivering torque from a device (not shown) from which shaft 12 extends through coupling device 10 to another device (not shown). Alternatively, shaft 12 may function as an output shaft—receiving torque through coupling device 10 from another device (not shown) and transferring that torque to a device (not shown) from which shaft 12 extends. Shaft 12 may be made from conventional metals and metal alloys and may be solid or tubular. Shaft 12 is centered about a rotational axis 36 and may be driven by an engine, electric motor or other conventional power source when functioning as an input shaft. In the illustrated embodiment shaft 12 is inserted into device 10 on the opposite side of device 10 as torque transmission member 32 ("standard mount").

Rotor 14 is provided for selective engagement with armature 26 to transmit torque between shaft 12 and member 32. Rotor 14 is disposed about axis 36 and is coupled to shaft 12 for rotation therewith. Rotor 14 may be made from conventional metals and metal alloys and includes a hub 38 and a rotor or coupling disc 40.

Hub 38 is tubular and defines a central bore into which shaft 12 extends. Hub 38 may define an axially extending keyway (not shown) shaped complementary to, and configured to receive, a key (not shown) in shaft 12. Alternatively, hub 38 may be shaped with an integral, radially extending key configured to be received within a keyway in shaft 12. At either axial end, hub 38 defines shoulders that abut against the inner races of bearings 20, 22 on one axial side of each bearing 20, 22 to support bearings 20, 22. Further, hub 38 may define one or more notches or lugs disposed in either axial end face of hub 38 configured to engage corresponding notches or lugs in spacers 16, 18 as described in greater detail in U.S. Pat. No. 7,527,134, the entire disclosure of which is incorporated herein by reference. At its radially outer diameter, hub 38 defines an axially extending inner rotor pole 42. Hub 38 further defines an axially extending recess 44 radially inwardly of pole 42 for a purpose described hereinbelow.

Disc 40 extends radially outwardly from hub 38 and defines a clutch engagement surface facing armature 26. Disc 40 is coupled to hub 38 through, for example, a press-fit relationship including a plurality of complementary lugs and notches. As is known in the art, disc 40 may include a plurality of radially spaced rows of angularly spaced, banana shaped slots (not shown). Upon energization of electromagnet 24, the slots cause magnetic flux to travel back and forth between disc 40 and armature 26 across an air gap enabling a high torque engagement between rotor 14 and armature 26. At its outer diameter, disc 40 defines an axially extending outer rotor pole 46. Pole 46 is radially aligned with pole 42 and spaced radially outwardly of pole 42.

Figure 2A:
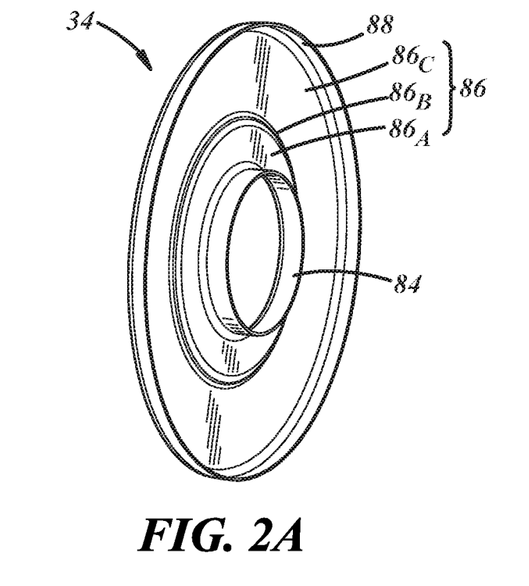
FIGS. 2A-B are perspective views of a shield and a spacer of the coupling device of FIG. 1.
Figure 2B:
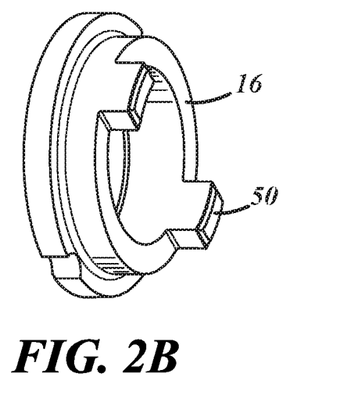

Spacer 16 is provided to support bearing 20 and electromagnet 24 in assembled relation with the other components of device 10 and may be made from conventional materials including powdered metals. Spacer 16 is disposed about axis 36 and is generally cylindrical in shape. An inner diameter of spacer 16 is sized to receive shaft 12. In accordance with one aspect of the present teachings, the inner diameter of spacer 16 is further sized to receive a portion of shield 34 and to engage shield 34 in an interference fit such that shield 34 is affixed to spacer 16. An outer diameter of spacer 16 varies to define a shoulder configured to abut the inner race of bearing 20 on an opposite side of bearing 20 relative to rotor hub 38 such that bearing 20 is disposed between opposed shoulders defined in spacer 16 and rotor hub 38. Spacer 16 is disposed radially inwardly of electromagnet 24 and the radially outermost surface of spacer 16 is radially separated from electromagnet 24 by an air gap 48 that is axially aligned with bearing 20. Referring to FIG. 2B, spacer 16 may further define one or more axially projecting lugs 50 or notches in an axial end face of spacer 16 configured to be received within or receive, respectively, corresponding notches or lugs in an axial end face of rotor hub 38 to rotatably couple spacer 16 and rotor hub 38.

Referring again to FIG. 1, spacer 18 is provided to support bearing 22 and torque transmission member 32 in assembled relation with the other components of device 10 and may be made from conventional materials including powdered metals. Spacer 18 may have a lower magnetic permeability than rotor 14, electromagnet 24 and armature 26 and may be made from, for example, non-ferromagnetic materials. Spacer 18 is disposed about axis 36 and is generally cylindrical in shape. Spacer 18 is configured to receive a fastener (not shown) that extends through spacer 18 and into shaft 12. Like spacer 18, the fastener may have a lower magnetic permeability than rotor 14, electromagnet 24 and armature 26 and may be made from, for example, non-ferromagnetic materials such as certain stainless steels. Spacer 18 may define a head 52 at one axial end having a plurality of flats that allow spacer 18 to be secured while applying torque to the fastener. Spacer 18 may further define a body 54 extending axially from head 52. Body 54 has a generally cylindrical outer surface on which bearing 22 may be supported between opposed shoulders defined in rotor hub 38 and spacer 18. Spacer 18 may further define one or more axially projecting lugs or notches in an axial end face of body 54 configured to be received within or receive, respectively, corresponding notches or lugs in an axial end face in rotor hub 38 to rotatably couple spacer 18 and rotor hub 38.

Bearing 20 is provided to allow rotation of rotor hub 38 and spacer 16 relative to electromagnet 24. Bearing 20 is conventional in the art. An inner race of bearing 20 is supported on spacer 16 and rotor hub 38 and abuts opposed shoulders defined in spacer 16 and rotor hub 38. An outer race of bearing 20 supports electromagnet 24.

Bearing 22 is provided to allow rotation of torque transmission member 32 relative to input shaft 12, rotor 14 and spacer 18. Bearing 22 is conventional in the art. An inner race of bearing 22 is supported on spacer 18 and rotor hub 38 and abuts opposed shoulders defined in spacer 18 and rotor hub 38. An outer race of bearing 22 supports torque transmission member 32.

Electromagnet 24 creates an electromagnetic circuit among rotor 14, electromagnet 24, and armature 26 to cause movement of armature 26 into engagement with rotor 14 and transmission of torque between shaft 12 and torque transmission member 32. Electromagnet 24 is disposed on one side of rotor disc 40 and includes a field shell or housing 56 and a conduction assembly 58.

Housing 56 is provided to house conduction assembly 58. Housing 56 also forms part of an electromagnetic circuit that causes the selective engagement of rotor 14 and armature 26. Housing 56 may be made from conventional metals and metal alloys, including steel. Housing 56 is cylindrical and is disposed about axis 36 and is supported on an outer race of bearing 20. Housing 56 is fixed against rotation. Housing 56 is generally U-shaped in cross-section and includes radially inner and radially outer annular members 60, 62.

Inner member 60 is supported on an outer race of bearing 20. Member 60 is generally L-shaped in cross-section and defines an axially extending inner pole 64. Pole 64 extends into recess 44 of hub 38 of rotor 14 and is therefore disposed radially inwardly of inner rotor pole 42. As described more fully in commonly assigned U.S. Pat. No. 7,493,996, the entire disclosure of which is incorporated herein by reference, the relative location of poles 42, 64 is advantageous for several reasons. First, the magnetic efficiency of the magnetic circuit involving rotor 14, armature 26 and housing 56 is improved by reducing the number of air gaps for at least some of the magnetic flux in the circuit. Second, the annular gap in which conduction assembly 58 is disposed is enlarged enabling easier insertion and fastening of assembly 58 within housing 56.

Outer member 62 is coupled to and supported on inner member 60. Outer member 62 defines an end wall 66, an axially extending outer pole 68, and a flange 70. End wall 66 extends radially outwardly from member 60. Pole 68 is integral with, and extends axially from, end wall 66. Pole 68 is disposed radially outwardly of pole 46 of rotor 14. Flange 70 is integral with, and extends radially outwardly from, pole 68 at an end of pole 68 opposite end wall 66. Flange 70 extends along at least a portion of the circumference of pole 68.

Conduction assembly 58 is provided to create a magnetic circuit among rotor 14, armature 26 and housing 56 to cause movement of armature 26 into engagement with rotor 14 and transmission of torque between shaft 12 and torque transmission member 32. Conduction assembly 58 is generally annular and is disposed about axis 36 within housing 56. In particular, assembly 58 is disposed between the inner and outer poles 64, 68 of housing 56. Assembly 58 includes a conductor 72 and a conductor shell 74.

Conductor 72 may comprise a conventional copper coil although other known conductors may alternatively be used. Conductor 72 may be connected electrically to a power supply (not shown) such as a battery. Upon energization of conductor 72, an electromagnetic circuit is formed between rotor 14, armature 26 and housing 56. Magnetic flux flows from outer pole 68 of housing 56 across an air gap to outer pole 46 of rotor 14. Flux then travels back and forth between disc 40 and armature 26 across the air gap between them. Flux then flows from disc 40 of rotor 14 to hub 38 of rotor 14. Finally, flux flows from hub 38 back to members 60, 62 of housing 56 along several paths. In particular, a portion of the flux flows directly from inner rotor pole 42 to outer member 62 of housing 56. Another portion of the flux flows from hub 38 through inner pole 64 of housing 56 defined by inner member 60 before flowing to outer member 62. Still another portion of the flux flows from hub 38 to spacer 16 radially inwardly of bearing 20 and then to inner member 60 and outer member 62 allowing a portion of the flux to avoid the high-density area of inner rotor pole 42 and inner housing pole 64 and further improving the magnetic efficiency of the circuit. In accordance with one aspect of the present teachings, a portion of this flux flowing from hub 38 to spacer 16 may flow from spacer 16 to shield 34 and then into members 60 and/or 62 of housing 56 in certain embodiments in order to provide an additional path for flux transfer and, as described in more detail below, improved contaminant protection for bearing 20.

Conductor shell 74 is provided to house conductor 72 and is also used to mount conductor 72 within housing 56. Shell 74 may be molded from conventional plastics. Shell 74 may include an integral terminal connector 76 through which conductor 72 may be electrically connected to a power source. Shell 74 may also define one or more lugs sized to be received within recesses in end wall 66 of member 62 of housing 56 to prevent rotation of conduction assembly 58. Shell 74 may include a radially outwardly extending flange disposed proximate outer pole 68 of housing 56 and affixed to member 62 of housing 56 at a plurality of points as described in commonly assigned U.S. Pat. No. 7,975,818, the entire disclosure of which is incorporated herein by reference.

Armature 26 is provided to transmit torque between rotor 14 and torque transmission member 32. Armature 26 may be made from a variety of conventional metals and metal alloys including steel. Armature 26 is annular in construction and disposed about, and may be centered about, axis 36. Armature 26 is disposed on one side of rotor disc 40 opposite electromagnet 24 and defines a clutch engagement surface facing rotor disc 40. Armature 26 is axially spaced from rotor disc 40 by an air gap. Like rotor disc 40, armature 26 may include a plurality of radially spaced rows of angularly spaced slots (not shown) that facilitate travel of magnetic flux back and forth between rotor 14 and armature 26 upon energization of conduction assembly 58. Armature 26 is coupled to transmission member 32. In particular, armature 26 may be coupled to torque transmission member 32 by a plurality of leaf springs 28.

Springs 28 transmit drive and braking torque from armature 26 to torque transmission member 32 and allow for axial movement of armature 26 relative to member 32 and towards and away from rotor disc 40. Springs 28 may be made from stainless steel and are connected at one end to armature 26 and at an opposite end to member 32 using conventional fasteners such as rivets, screws, bolts, or pins.

Brake plate 30 provides a braking surface for engagement by armature 26 to brake torque transmission member 32. Brake plate 30 may be made from conventional materials having a relatively high magnetic permeability including conventional metals and metal alloys such as steel. Brake plate 30 extends about at least a portion of the circumference of device 10, and preferably only a portion of the circumference of device 10, and is coupled to housing 56. In particular, brake plate 30 is coupled to flange 70 of housing 56 and suspended therefrom using one or more fasteners 78. Fasteners 78 may be made from a material or materials (including non-magnetic materials) having a magnetic permeability lower than that of rotor 14, armature 26 and housing 56 to reduce or eliminate flux transfer between brake plate 30 and housing 56 and thereby facilitate clutch engagement when conduction assembly 58 is energized. Brake plate 30 may be axially spaced from flange 70 of housing 56 using one or more spacers 80 or shims such as the spacers and shims described in commonly assigned U.S. Pat. No. 8,123,012, the entire disclosure of which is incorporated herein by reference. Spacers 80 allow for adjustment of the position of brake plate 30 to compensate for wear on the clutch engagement surfaces of rotor 14 and armature 26, respectively and on the brake engagement surfaces of armature 26 and brake plate 30. Spacers 80 may include bores through which fasteners 78 extend. Spacers 80 may likewise be made from a material or materials (including non-magnetic materials) having a relatively lower magnetic permeability than that of rotor 14, armature 26 and housing 56 to reduce or eliminate flux transfer between brake plate 30 and housing 56. Referring, for example, to commonly assigned U.S. Pat. No. 7,732,959, the entire disclosure of which is incorporated herein by reference, plate 30 may house one or more magnets (not shown) and thereby form part of a magnetic circuit with armature 26 and the magnets to assist springs 28 in drawing armature 26 into engagement with brake plate 30 to provide a braking torque to torque transmission member 32.

Torque transmission member 32 transfers torque between shaft 12 and another device such as a lawnmower blade. Member 32 is coupled to armature 26 through leaf springs 28 and is supported for rotation on the outer race of bearing 22. Member 32 is disposed about, and may be centered about, axis 36. Member 32 defines a radially outwardly ending flange 82 defining a plurality of bores configured to receive fasteners used to couple member 32 to a driving or driven device.

Shield 34 is provided to inhibit contaminants such as fluids or dust from damaging bearing 20. In particular, shield 34 inhibits the passage of contaminants from the external environment through air gap 48 to bearing 20. Shield 34 may be made from a variety of materials. In certain embodiments, shield 34 is made from materials having a relatively high magnetic permeability such as ferromagnetic materials such that shield 34 transfers flux from spacer 16 to members 60, 62 of housing 56 of electromagnet 24. Shield 34 is annular in shape and is disposed about, and may be centered about, axis 36. Referring to FIG. 2A, shield 34 includes an axially extending portion 84 that defines a radially inner surface of shield 34. Referring to FIG. 1, portion 84 is configured to be surround shaft 12 and to be received within, and disposed radially inwardly of, spacer 16 and to be supported on a radially inner surface of spacer 16. The outer diameter of portion 84 may be slightly larger than the inner diameter of spacer 16 such that the radially outer surface of portion 84 of shield 34 engages the radially inner surface of spacer 16 in an interference fit. Alternatively, in some embodiments, the outer diameter of portion 84 may be slightly smaller than the inner diameter of spacer 16 such that shield 34 engages spacer 16 in a slip fit. Shield 34 further includes a radially extending portion 86 that extends radially outwardly from portion 84 an is axially aligned with air gap 48. Referring again to FIG. 2A, portion 86 includes a radially extending section 86A that extends radially outwardly from portion 84, a transition section 86B that extends in both an axial and radial direction from section 86A and a radially extending section 86c that extends radially outwardly from section 86B. Referring to FIG. 1, transition section 86B may be axially aligned with air gap 48 and allows shield 34 to deform under certain conditions as described below. Shield 34 further includes an axially extending portion 88 that defines a radially outer surface of shield 34. Portion 88 extends axially from portion 86 (and, in particular, section 86c of portion 86) towards member 62 of housing 56 of electromagnet 24. As noted above, in some embodiments shield 34 may be made from materials, such as ferromagnetic materials, that allow magnetic flux to travel from hub 38 to electromagnet 24 (through spacer 16 and shield 34) when electromagnet 24 is energized. The flow of magnetic flux may further result in deformation of shield 34 and improved sealing for bearing 20. In particular, shield 34 has a normal or unstressed state when electromagnet 24 is not energized. In this state, portion 88 of shield 34 may be axially spaced from member 62 of housing 56 of electromagnet 24. When electromagnet 24 is energized, shield 34 assumes a deformed or stressed state. In this state, the magnetic flux traveling through shield 34 to housing 56 of electromagnet 24 creates a magnetic attraction between shield 34 and housing 56 causing portion 88 of shield 34 to contact member 62 of housing 56 of electromagnet 24. The physical contact between shield 34 and housing 56 of electromagnet 24 further reduces the likelihood that contaminants will reach air gap 48 and bearing 20.

Figure 3:
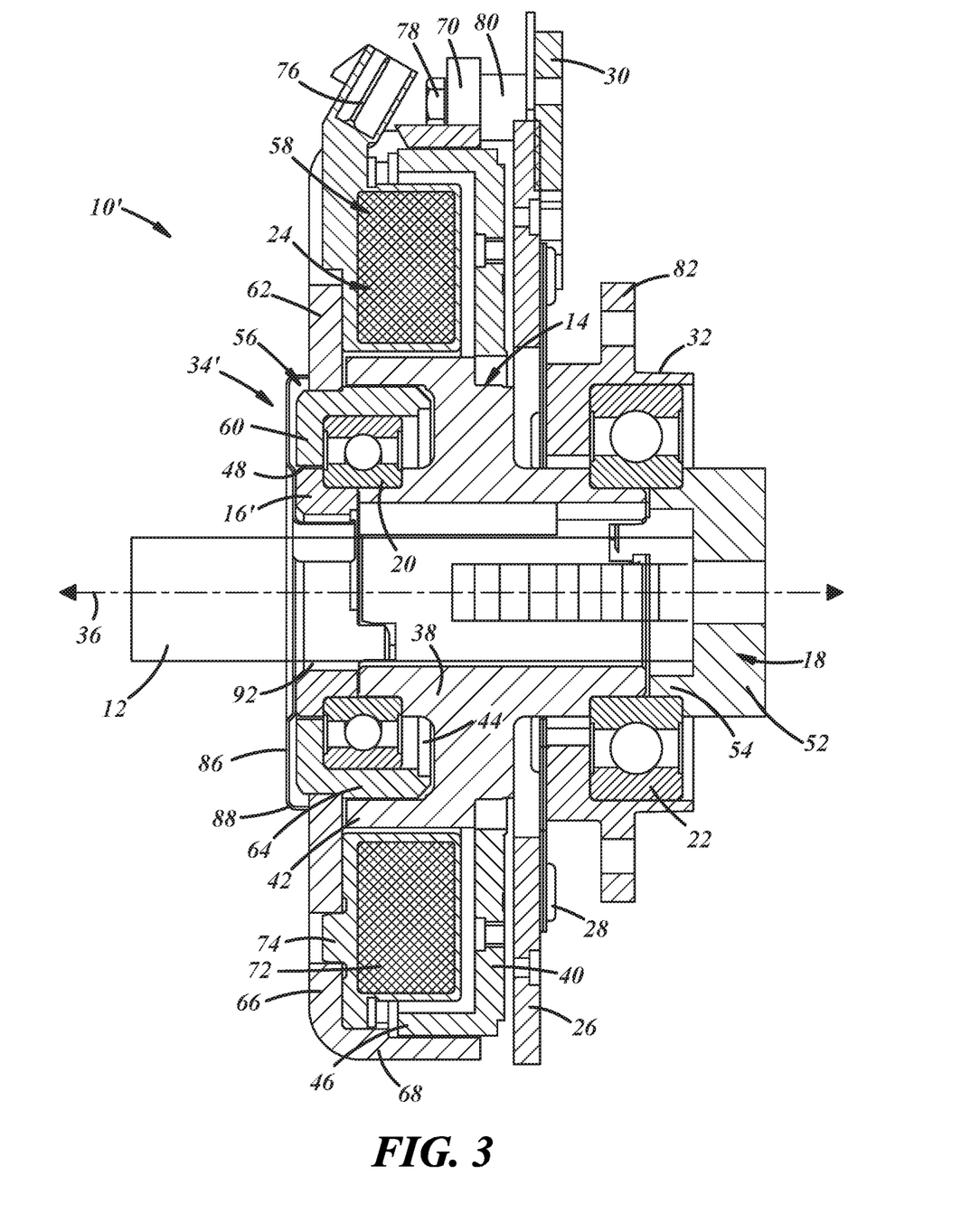
FIG. 3 is a cross-sectional drawing of a rotational coupling device in accordance with another embodiment of the present teachings.

Referring now to FIG. 3, a rotational coupling device 10' in accordance with another embodiment of the present invention is illustrated. Device 10' is substantially similar to device 10. Like components in devices 10 and 10' have the same numbers and a description of these components may be found hereinabove. Device 10' differs from device 10 in that spacer 16 and shield 34 in device 10 are replaced by spacer 16' and shield 34' in device 10'.

Figure 4A:
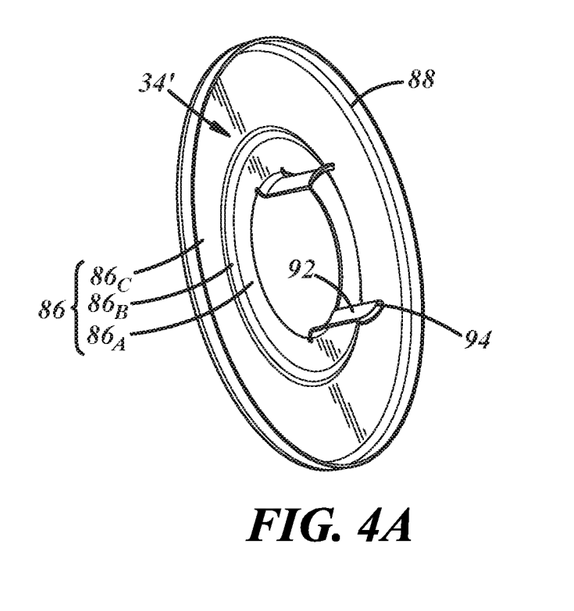
FIGS. 4A-B are perspective views of a shield and a spacer of the coupling device of FIG. 3.
Figure 4B:
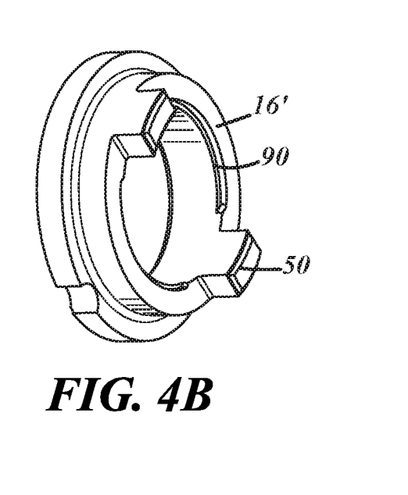

Spacer 16' is similar to spacer 16 described hereinabove. Referring to FIG. 4B, however, spacer 16' defines one or more grooves 90 in the a radially inner surface of spacer 16. Grooves 90 may be formed in one axial end of spacer 16'. In the illustrated embodiment, spacer 16' includes two arcuate grooves 90 that are diametrically opposite one another. It should be understood, however, that the number and orientation of grooves 90 may vary.

Shield 34' is similar to shield 34 described hereinabove. Shield 34', however, does not include an inner, axially extending portion 84 as in shield 34. Referring to FIG. 4A, shield 34' instead defines one or more tabs 92. Tabs 92 extend in a generally axial direction from portion 86 of shield 34'. In the illustrated embodiment, shield 34' includes two tabs 92 that are diametrically opposite one another. It should be understood, however, that the number and orientation of tabs 92 may vary. Each tab 92 includes a generally radially outwardly extending flange 94 at the end of tab 92 that is configured to be received within a corresponding groove 90 in spacer 16'. During assembly of shield 34' to spacer 16', tabs 92 initially deflect inwardly to a deformed or stressed state as shield 34 is moved in an axial direction into spacer 16' and flanges 94 engage the radially inner surface of spacer 16'. Once flanges 94 are aligned with grooves 90, tabs 92 return to their normal or unstressed state and flanges 94 snap into grooves 90 to affix shield 34' to spacer 16'.

A rotational coupling device 10 or 10' in accordance with the present teachings is advantageous relative to conventional coupling devices. The coupling device 10 or 10' includes a shield 34 or 34' that inhibits contaminants such as fluids and particulates from reaching a bearing 20 of the device 10 or 10'. Because the shield 34 or 34' is supported by the spacer 16 or 16' of the device 10 or 10', in certain embodiments the shield 34 or 34' may be included with the device 10 or 10' as a pre-assembled unit thereby eliminating the need to maintain a separate inventory of bearing shields and eliminating assembly of the shield to the bearing 20. Further, because the shield 34 or 34' is not attached to the bearing race, potential damage and/or misalignment of the bearing 20 during assembly is reduced. In certain embodiments, the shield 34 or 34' is also configured to provide an additional flux transfer path for the electromagnetic circuit in the coupling device 10 or 10' to improve flux transfer within the device 10 or 10. In certain embodiments, the shield 34 or 34' may also deform in the presence of magnetic flux to reduce the size of an opening leading to the bearing 20 and improve sealing of the bearing 20.

While the invention has been shown and described with reference to one or more particular embodiments thereof, it will be understood by those of skill in the art that various changes and modifications can be made without departing from the spirit and scope of the invention.

What is claimed is:

1. A rotational coupling device, comprising: a rotor configured for rotation about a rotational axis, the rotor including a rotor hub disposed about the rotational axis and configured to receive a shaft and a rotor disc extending radially outwardly from the rotor hub; an armature disposed on a first axial side of the rotor disc; an electromagnet disposed on a second axial side of the rotor disc opposite the armature and fixed against rotation; a bearing disposed between the rotor hub and the electromagnet, the rotor hub engaging an inner race of the bearing on a first axial side of the bearing and the electromagnet engaging an outer race of the bearing on a second axial side of the bearing; a spacer disposed radially inwardly of the electromagnet and engaging the inner race of the bearing on the second axial side of the bearing, an air gap separating the spacer from the electromagnet; and, a shield supported by the spacer and extending radially outwardly therefrom such that a first portion of the shield is axially aligned with the air gap and at least one of the first portion and a second portion of the shield is spaced from the electromagnet,
wherein the shield is supported on a radially inner surface of the spacer.

2. The rotational coupling device of claim 1 wherein the shield engages the spacer in an interference fit.

3. The rotational coupling device of claim 1 wherein the shield includes a tab configured to be received within a groove in the spacer.

4. The rotational coupling device of claim 3 wherein the groove is formed in the radially inner surface of the spacer.

5. The rotational coupling device of claim 4 wherein the groove is formed in a one axial end of the spacer.

6. The rotational coupling device of claim 1 wherein the shield includes an axially extending portion disposed radially inwardly of the spacer and a radially extending portion axially aligned with the air gap.

7. The rotational coupling device of claim 1 wherein the shield is made from a ferromagnetic material.

8. A rotational coupling device, comprising:
a rotor configured for rotation about a rotational axis, the rotor including a rotor hub disposed about the rotational axis and configured to receive a shaft and a rotor disc extending radially outwardly from the rotor hub;
an armature disposed on a first axial side of the rotor disc;
an electromagnet disposed on a second axial side of the rotor disc opposite the armature and fixed against rotation;
a bearing disposed between the rotor hub and the electromagnet, the rotor hub engaging an inner race of the bearing on a first axial side of the bearing and the electromagnet engaging an outer race of the bearing on a second axial side of the bearing;
a spacer disposed radially inwardly of the electromagnet and engaging the inner race of the bearing on the second axial side of the bearing, an air gap separating the spacer from the electromagnet; and,
a shield supported by the spacer and extending radially outwardly therefrom such that a first portion of the shield is axially aligned with the air gap and at least one of the first portion and a second portion of the shield is spaced from the electromagnet
wherein magnetic flux travels from the rotor hub to the electromagnet through the shield when the electromagnet is energized.

9. The rotational coupling device of claim 8 wherein the shield is supported on a radially inner surface of the spacer.

10. The rotational coupling device of claim 8 wherein the shield engages the spacer in an interference fit.

11. The rotational coupling device of claim 8 wherein the shield includes a tab configured to be received within a groove in the spacer.

12. The rotational coupling device of claim 8 wherein the shield includes an axially extending portion disposed radially inwardly of the spacer and a radially extending portion axially aligned with the air gap.

13. The rotational coupling device of claim 1 wherein the shield is made from a ferromagnetic material.

14. A rotational coupling device, comprising:
a rotor configured for rotation about a rotational axis, the rotor including a rotor hub disposed about the rotational axis and configured to receive a shaft and a rotor disc extending radially outwardly from the rotor hub;
an armature disposed on a first axial side of the rotor disc;
an electromagnet disposed on a second axial side of the rotor disc opposite the armature and fixed against rotation;
a bearing disposed between the rotor hub and the electromagnet, the rotor hub engaging an inner race of the bearing on a first axial side of the bearing and the electromagnet engaging an outer race of the bearing on a second axial side of the bearing;
a spacer disposed radially inwardly of the electromagnet and engaging the inner race of the bearing on the second axial side of the bearing, an air gap separating the spacer from the electromagnet; and, a shield supported by the spacer and extending radially outwardly therefrom such that a portion of the shield is axially aligned with the air gap wherein the shield assumes a first state when the electromagnet is not energized in which the shield is axially spaced from the electromagnet and the shield deforms and assumes a second state when the electromagnet is energized in which the shield contacts the electromagnet.

15. The rotational coupling device of claim 14 wherein the shield is supported on a radially inner surface of the spacer.

16. The rotational coupling device of claim 14 wherein the shield engages the spacer in an interference fit.

17. The rotational coupling device of claim 14 wherein the shield includes a tab configured to be received within a groove in the spacer.

18. The rotational coupling device of claim 14 wherein the shield includes an axially extending portion disposed radially inwardly of the spacer and a radially extending portion axially aligned with the air gap.

19. The rotational coupling device of claim 14 wherein the shield is made from a ferromagnetic material.

* * * * *